(12) United States Patent
Mohni

(10) Patent No.: US 10,694,888 B2
(45) Date of Patent: Jun. 30, 2020

(54) COOKING DEVICE FOR USE WITH AN EDIBLE

(71) Applicant: Richard Mohni, Port Huron, MI (US)

(72) Inventor: Richard Mohni, Port Huron, MI (US)

( * ) Notice: Subject to any disclaimer, the term of this patent is extended or adjusted under 35 U.S.C. 154(b) by 311 days.

(21) Appl. No.: 15/888,179

(22) Filed: Feb. 5, 2018

(65) Prior Publication Data

US 2019/0239679 A1   Aug. 8, 2019

(51) Int. Cl.
*A47J 33/00* (2006.01)
*A47J 37/07* (2006.01)
*A47J 43/18* (2006.01)

(52) U.S. Cl.
CPC ............... *A47J 33/00* (2013.01); *A47J 37/07* (2013.01); *A47J 43/18* (2013.01)

(58) Field of Classification Search
CPC ............ A47J 33/00; A47J 43/18; A47J 37/07
See application file for complete search history.

(56) References Cited

U.S. PATENT DOCUMENTS

| 345,307 | A | | 7/1886 | Jones |
| 432,863 | A | | 7/1890 | Christin |
| 2,226,844 | A | * | 12/1940 | Carr .................. A47J 29/00 249/77 |
| 2,760,428 | A | | 8/1956 | Boyajian |
| 2,973,750 | A | | 3/1961 | Armacost |
| 3,805,384 | A | * | 4/1974 | Falcone ............... A47J 17/02 30/121.5 |
| 4,106,486 | A | | 8/1978 | Lee |
| 5,355,778 | A | * | 10/1994 | Mayfield ............. A47J 43/18 220/485 |
| 8,215,856 | B1 | | 7/2012 | Daubach et al. |
| 2017/0208982 | A1 | | 7/2017 | Liu |

FOREIGN PATENT DOCUMENTS

WO       2008155115 A1   12/2008

* cited by examiner

*Primary Examiner* — Rick K Chang
(74) *Attorney, Agent, or Firm* — Dinsmore & Shohl LLP

(57) ABSTRACT

A ground embedded and stainless steel heat conducting canister for containing a husked corn on the cob ear in upward supported fashion. The canister includes an attachable cap with a vented top and, upon pre-filling a volume of water, installing the ear of corn, and arraying upwardly within or in proximity to the fire, the corn is progressively steam cooked within the canister, following which it can be removed from the fire, the cap opened and the cooked ear removed.

11 Claims, 4 Drawing Sheets

COOKING DEVICE FOR USE WITH AN EDIBLE

FIELD OF THE INVENTION

The present invention relates generally to a portable steaming device such as for use during camping or outdoor activities involving an open fire. More specifically, the present invention discloses a ground embedded and stainless steel heat conducting canister for containing a husked corn on the cob ear in upward supported fashion. The canister includes an attachable cap with a vented top and, upon pre-filling a volume of water, installing the ear of corn, and arraying upwardly within or in proximity to the fire, the corn is progressively steam cooked within the canister, following which it can be removed from the fire, the cap opened and the cooked corn cob removed.

BACKGROUND OF THE INVENTION

The prior art is documented with examples of cooking devices or techniques for cooking an ear of corn. The most simplest of which is to wrap the ear of corn within a sheet of tin foil and to place the corn within or in proximity to a source of heat, such as a grill or fire. This can also include placing the individual ears of corn (with or without the foil covering) upon a grated, rack or tier positioned above the heat source.

Other attempts have been made in the art to provide for steam cooking of edibles such as vegetables. One such example is the steam cooking utensil of L. D. Jones, U.S. Pat. No. 345,307 and which provides a steam cooker placed upon a pot and including an open bottom for enabling steam cooking of water contained within the pot and vaporized by the heat source.

Another prior art reference of note is the cooking utensil of Lee, U.S. Pat. No. 4,106,486 which teaches a perforated inner pan which nests completely within an outer non-perforated open top pan. A cover encloses the opening of the outer pan and contains the inner pan. The opposed ends of the perforated pan are hinged so as to open flat in the plane of the pan's bottom, with handles on the hinged ends providing manipulation of the inner pan without opening.

Finally, WO 2008/155115, to Harkin, teaches a cooking utensil having a vessel for holding a volume of boiling water and a removable holder for retaining a plurality of food items, the removable holder being locatable within the vessel and including a locating means for locating the food items therein to prevent them for coming into contact with a base of the vessel. The removable holder further includes a lifting means permitting the removal of the removable food holder and its contents from the vessel.

SUMMARY OF THE INVENTION

The present invention discloses a portable steaming device such as for use during camping or outdoor activities involving an open fire and, more specifically, a ground embedded or otherwise surface arrayed heat conducting canister (including but not limited to a stainless steel composition) for containing a husked corn on the cob ear in upward supported fashion. The canister includes an attachable cap with a vented top and, upon pre-filling a volume of water, installing within the canister the ear of corn, and arraying upwardly within or in proximity to the fire, the corn is progressively steam cooked inside the canister, following which the canister is removed from the fire, the cap opened and the cooked ear removed.

Additional features include forming vents between the screw on (or otherwise attachable) cap and the opposing outer inter-engaging annular threads associated with the upper closable end of the cylinder. A corkscrew further extends from the inside end surface of the cap and is embedded into the opposing surface of the corn cob upon the cob being rotationally attached to the cap. In this manner the cob is suspended within the cylinder in a manner which better assists in steam cooking resulting from the heating and vaporization of the bottom interior supported volume of water deposited into the cylinder once placed in upright proximity to the fire.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 7:
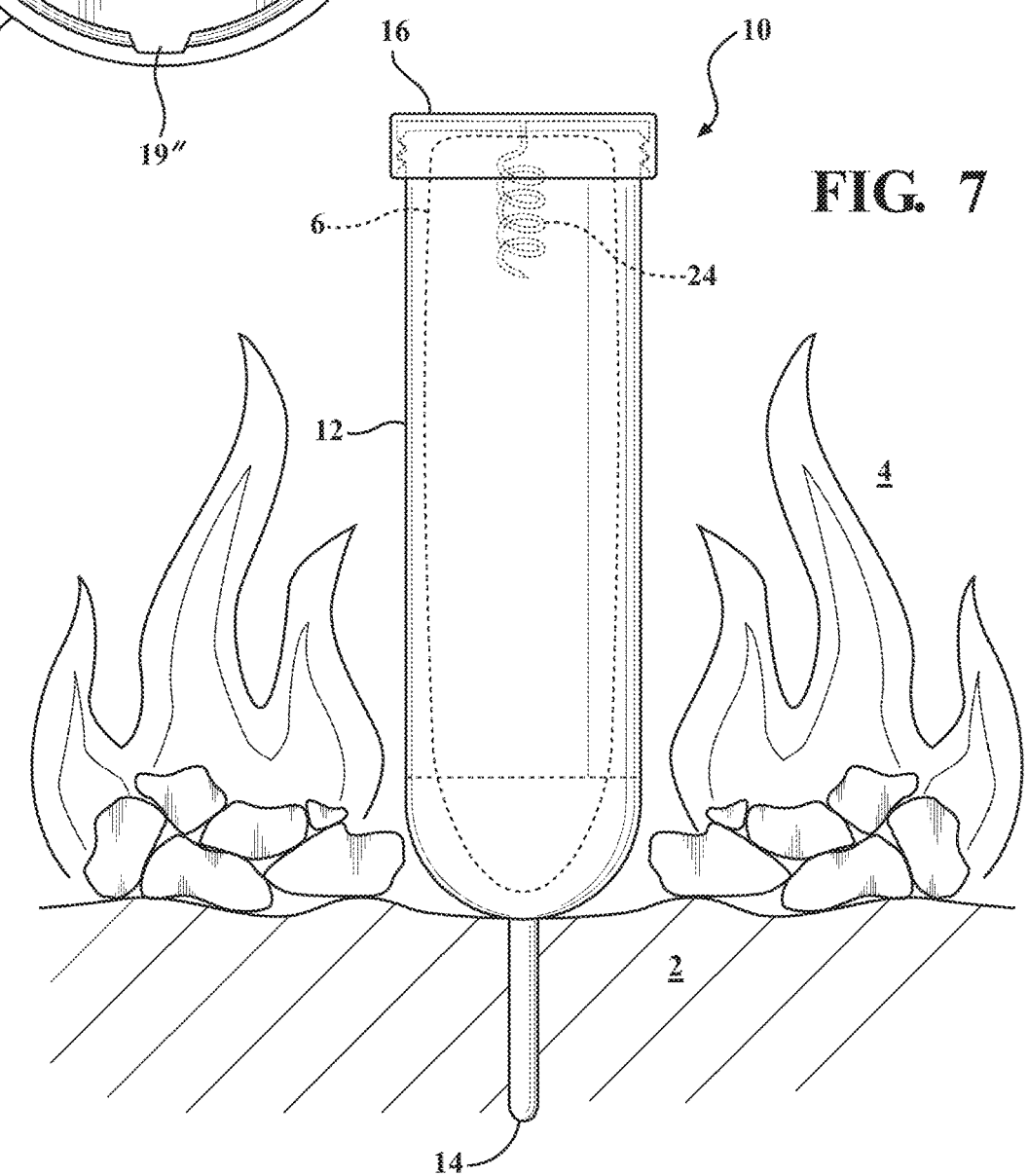
FIG. 7 is an environmental view illustrating the portable steaming device embedded into a ground location proximate an open fire or other surrounding heat source.
Figure 5:
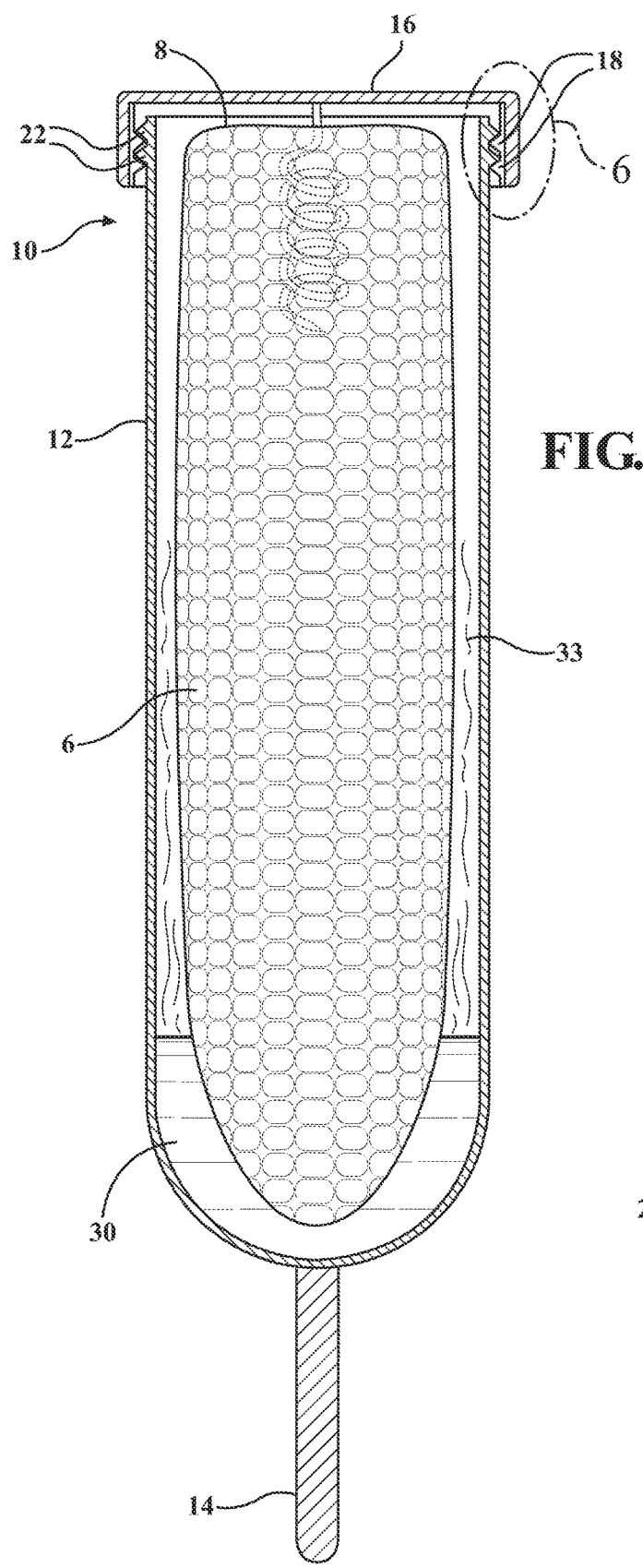
FIG. 5 is a plan cutaway view of the corn cob contained within the portable steaming device and illustrating the bottom interior partially filled with a liquid (such as water) to assist with steam cooking when laced in proximity to a fire/heat source.
Figure 6:
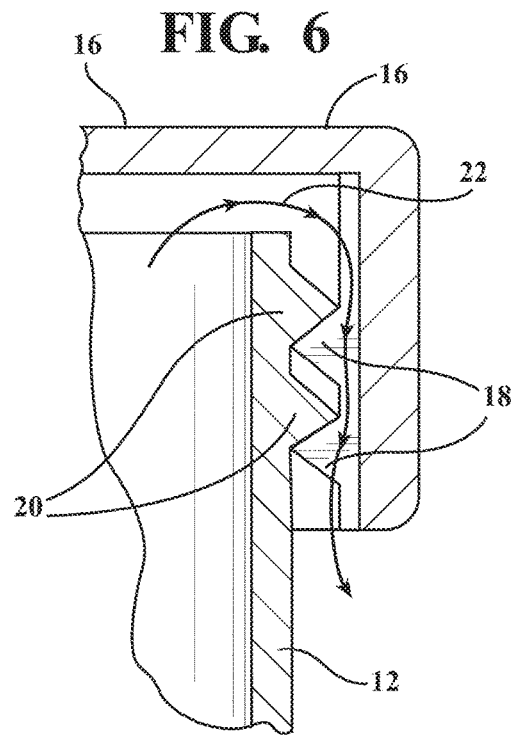
FIG. 6 is an enlargement of the partial view depicted in FIG. 5 of the interface established between the underside interior threads of the cap and those associated with the opposing and outer and inter-engaging annular threads configured into the uppermost end of the portable steaming main body.

With reference to FIGS. 1-7, the present invention again discloses a ground embedded and stainless steel heat conducting canister for containing a husked corn on the cob ear in upward supported fashion. This is best shown by the environmental view of FIG. 7 depicting an overall enclosed canister assembly 10 including a main cylinder shaped body 12 an end-projecting turf stake 14 (can be either rounded or sharp edged tip) adapted for engaging into a ground surface location 2, such as in order to embed the canister assembly in an upright projecting fashion in proximity to a heated (such as open fire) surrounding 4.

The main cylinder body 12 can include any heat conductive material and, in one non-limiting embodiment, includes a stainless steel construction. As is further shown, a top end of the body defines an open annular rim for receiving the corn cob which is further shown at (see also FIGS. 1-3 and 5) and which is suitably dimensioned for being inserted inside of the cavity receiving interior of the cylindrical body 12, the cob 6 further including a rear mounting end face 8.

Figure 1:
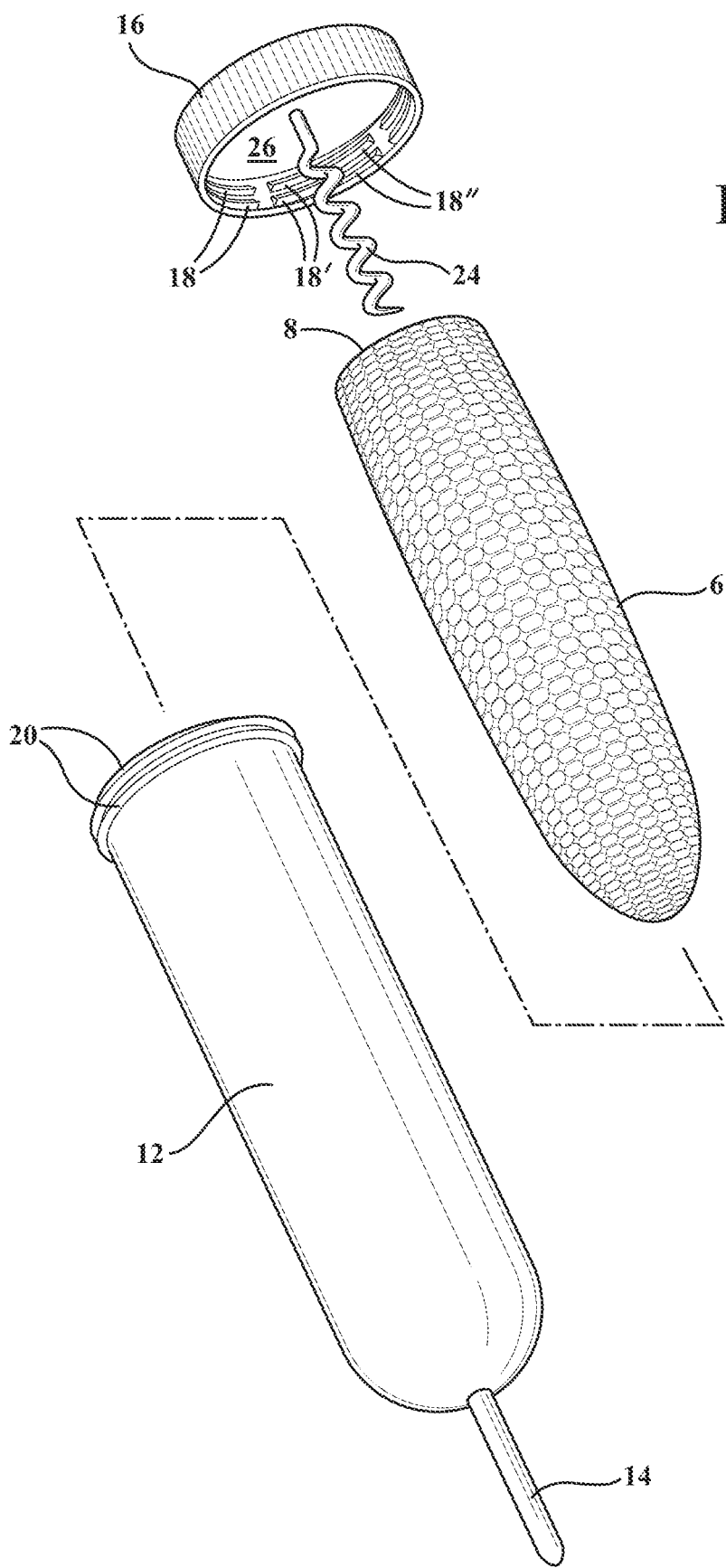
FIG. 1 is an exploded perspective of the portable steaming device according to one non-limiting embodiment of the present invention.
Figure 2:
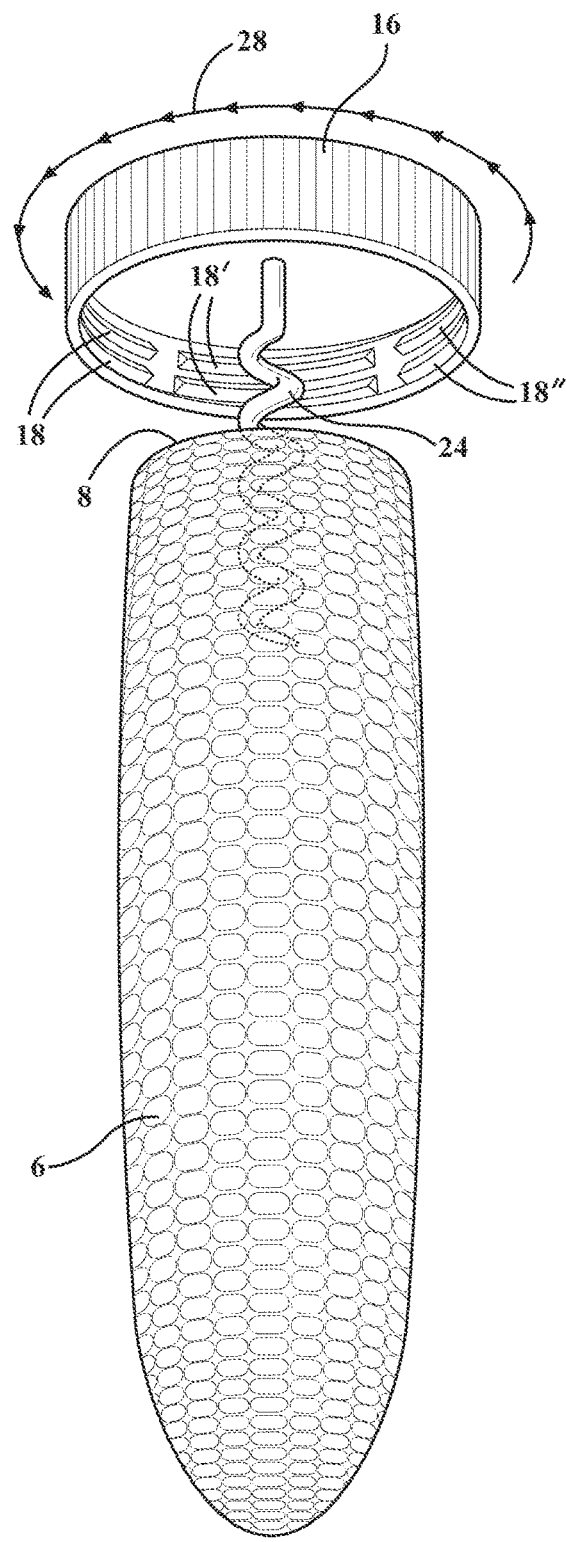
FIG. 2 is a perspective of a cap portion with an integral extending corkscrew for engaging an end surface of a corn cob prior to installation within the steaming device.
Figure 4:
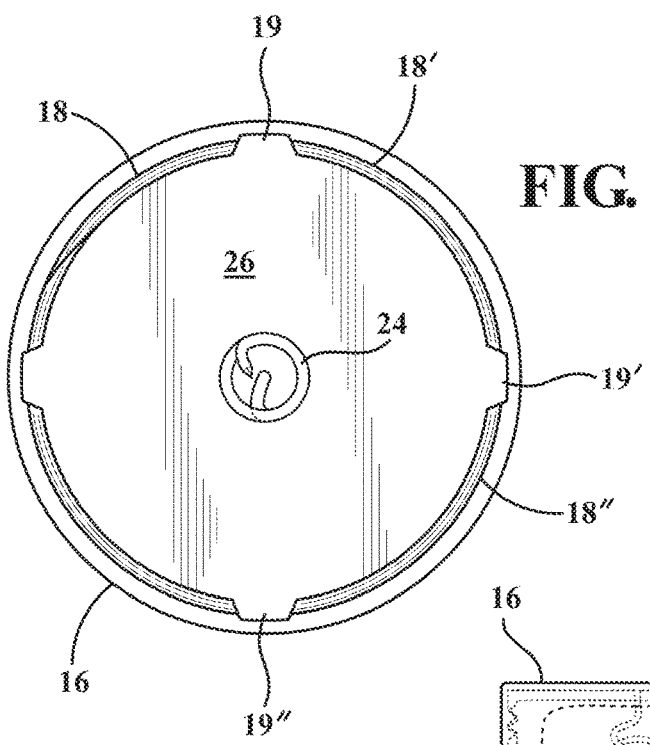
FIG. 4 is an inside end view of the attachment cap and, in combination with FIGS. 1-2, better illustrating the inside annular profile of the underside cap threads, these including circumferentially spaced gaps for permitting release of pressurized steam associated with the cooking of the cob of corn.

The canister assembly includes an attachable cap 16, such further including any type of aluminum or other partially insulating material which will not become unduly hot after cooking so that it may be more easily manipulated to the open position, and further which, in the illustrated embodiment, exhibits a plurality of circumferential threads, these being shown in each of FIGS. 1, 2 and 4 as individual segmented pluralities of threads 18, 18', 18" et seq. extending about the inside rim of the cap sidewall. The segmenting of the cap threads is so that, and upon rotation-ally attaching to exterior inter-engaging threads 20 configured at the open top of the main body 12, a plurality of annular spaced gaps or vents are configured therebetween (these best shown at 19, 19', 19" in the underside end cap view of FIG. 4) which permits heated/cooking generated steam and attendant internal pressure resulting from such cooking to escape from the interior of the body (see also arrow 22 in FIG. 6).

Figure 3:
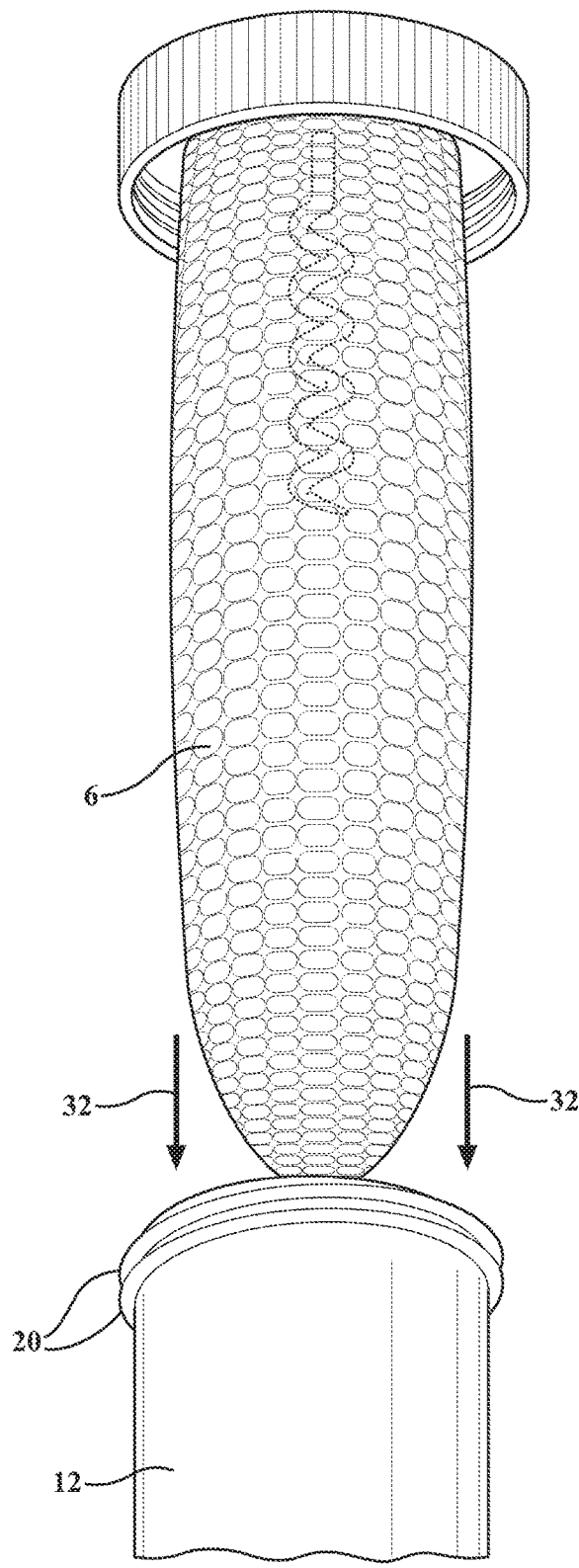
FIG. 3 is a succeeding illustration to FIG. 2 and depicting the cap and attached cob in the process of being installed within the main heat conducting body of the portable steaming device.

A corkscrew portion 24 extends from an interior end surface 26 of the cap, such being engaged by the opposing end face 8 of the corn cob upon inter-rotating the cob relative to the cap 16 (see further arrow 28 designated in FIG. 2) and in order to pre-install the corn cob as further depicted in FIG. 3. A volume of water (at 30 in FIG. 5 cutaway) is then pre-deposited into the open interior of the body 12, following which the cap 16 with attached corn cob 6 is lowered into the body (see also direction arrows 32 in FIG. 3), in a manner which defines at least a minimal spacing between the outer surface of the corn cob 6 and the opposing inner annular wall surface of the main body 12 (this annular space depicted at 33 in FIG. 5 cutaway to define the ability of the heated liquid/water 30 to be communicated upwardly for eventual venting through the interface established between the cap underside and the upper threads of the body (again FIG. 6). In this manner, the and upon arraying the cylinder assembly 10 in a linearly upright or upwardly directed fashion within or in proximity to the fire or other heated external environment 4, the corn is progressively steam cooked within the canister, following which it can be removed from the fire, the cap opened and the cooked ear 6 removed with the cap and then subsequently counter rotationally removed from the underside cap projecting corkscrew.

While a single preferred embodiment is illustrated, it is understood that the present design is amenable to modification and without departing from the scope of the invention. This can include reconfiguring the venting arrangement established between the cap and the surrounding engaging surface of the main upper body, such as by making the threads segmented on the annular body threads 20.

It is also envisioned that the cap can be redesigned to be a flip type cap which is hingedly attached to the body, with the corn cob suspended within the interior of the main body in some other fashion than which is shown. This can include substituting the corkscrew with any other suitable clasp, grip or puncture mechanism for supporting the corn cob to either the cap underside or in interiorly spaced fashion between the outer coaxial side wall of the main body. Further, and while the pre-depositing of a volume of water is needed for steam cooking of corn, it is also understood that other water entrained edibles may not require a separate reservoir of water pre-deposited into the cylinder interior prior to being steam cooked.

Other modifications can include reconfiguring any of the shape or material construction of the main canister body, such as to make it modular for bunching or otherwise attaching together a plurality of individual bodies. This can further include redesigning the body to hold a plurality of individual corn cobs in linear or bundled fashion. To this end, the present design can be reconfigured from outdoor use (such as camping or recreational in use with an open fire) to larger scale commercial use such as utilized with commercial cooking equipment in which any design falling within the scope of the invention can be installed or supported relative thereto.

Having described my invention, other and additional preferred embodiments will become apparent to those skilled in the art to which it pertains, and without departing from the scope of the appended claims:

I claim:

1. A cooking device for use with an edible, comprising:
a body adapted to receive the edible within an interior;
a cap securing to an upper end of said body, said cap further including a corkscrew portion extending from an underside for securing the edible in suspended fashion relative thereto, said body being subsequently arrayed in a linear upright extending direction within a cooking environment;
a venting interface established between said cap and said body for releasing any of steam or pressure resulting from the cooking environment.

2. The invention of claim 1, said body further comprising a cylindrical tube.

3. The invention of claim 1, further comprising a ground stake extending from an end of said body and adapted to engage a ground location.

4. The invention of claim 1, said body further comprising a stainless steel heat conducting construction.

5. The invention of claim 1, said cap further comprising a partially insulating aluminum construction.

6. The invention of claim 1, said venting interface further comprising opposing first and second pluralities of inter-engaging threads established between said cap and said body, at least one of said plurality of threads including circumferentially spaced subset portions defining vents therebetween.

7. A cooking canister for an ear of corn supported in an outdoor fire location, comprising:
a cylindrical body adapted to receive the corn within an interior;
a cap including a corkscrew projecting portion for securing an end of the corn and prior to depositing the corn within said body, said cap engaging to the body to define a venting interface therebetween; and
said body being subsequently arrayed in a linear upright extending direction within a cooking environment, said venting interface releasing any of steam or pressure resulting from the cooking environment.

8. The cooking canister of claim 7, further comprising a stake portion extending from a lower end of said cylindrical body.

9. The cooking canister of claim 7, said body further comprising a stainless steel heat conducting construction.

10. The cooking canister of claim 7, said cap further comprising a partially insulating aluminum construction.

11. The cooking canister of claim 7, said venting interface further comprising opposing first and second pluralities of inter-engaging threads established between said cap and said body, at least one of said plurality of threads including circumferentially spaced subset portions defining vents therebetween.

\* \* \* \* \*